United States Patent [19]
Sutton et al.

[11] Patent Number: 5,412,687

[45] Date of Patent: May 2, 1995

[54] DIGITAL COMMUNICATIONS EQUIPMENT USING DIFFERENTIAL QUATERNARY FREQUENCY SHIFT KEYING

[75] Inventors: Jeff R. Sutton, San Jose; Juan G. Grau, Jr., San Mateo, all of Calif.

[73] Assignee: Proxim Incorporated, Mountain View, Calif.

[21] Appl. No.: 136,749

[22] Filed: Oct. 15, 1993

[51] Int. Cl.⁶ .............................................. H04K 1/00
[52] U.S. Cl. ....................................... 375/202; 380/34
[58] Field of Search ......................... 375/1; 380/33, 34

[56] References Cited

U.S. PATENT DOCUMENTS

| | | | |
|---|---|---|---|
| 4,291,409 | 9/1981 | Weinberg et al. | 375/1 |
| 4,481,640 | 11/1984 | Chow et al. | 375/1 |
| 4,672,658 | 6/1987 | Kavehrad et al. | 375/1 |
| 4,707,839 | 11/1987 | Andren et al. | 375/1 |
| 4,862,478 | 8/1989 | McIntosh | 375/1 |
| 4,930,140 | 5/1990 | Cripps et al. | 375/1 |
| 4,964,138 | 10/1990 | Nease et al. | 375/1 |
| 5,121,408 | 6/1992 | Cai et al. | 375/1 |
| 5,134,630 | 7/1992 | Bateman | 375/1 |
| 5,210,770 | 5/1993 | Rice | 375/1 |
| 5,267,271 | 11/1993 | Rice | 375/1 |

*Primary Examiner*—David C. Cain
*Attorney, Agent, or Firm*—Burns, Doane, Swecker & Mathis

[57] ABSTRACT

A digital radio transceiver uses a differential 4-ary frequency shift keying (D4FSK) modulation scheme to achieve a radio that is low cost, miniaturizable, low in power consumption, and high in spectral efficiency. An adaptive digital "slicer" looks at a digitized FM video signal produced in the receiver to determine if the data sent is a 00, 01, 10 or 11. The digitized FM video signal is first processed by a differential decoder, the output of which is input to a peak detector. The peak detector outputs a signal upon the occurrence of a three-step transition, i.e., a peak-to-peak voltage value. Two-step and three-step transitions are separately detected and used to perform digital clock recovery. A carrier detect circuit uses a digital bit filter to produce a carrier detect signal that is reliable and glitch-free. The digital radio transceiver uses frequency hopping spread spectrum transmission. A switchable loop bandwidth frequency synthesizer provides for glitch-free switching between a wide hopping bandwidth and a narrow bandwidth between hops.

25 Claims, 7 Drawing Sheets

DIGITAL COMMUNICATIONS EQUIPMENT USING DIFFERENTIAL QUATERNARY FREQUENCY SHIFT KEYING

BACKGROUND OF THE INVENTION

1. Field of the Invention

The present invention relates to digital communications equipment such as digital radio transceivers. In particular, the invention relates to spread spectrum digital radio transceivers and digital radio transceivers using differentially encoded four state modulation.

2. State of the Art

In recent years, the use of wireless local area networks ("LANs") has become widespread. In wireless LANs, digital radio transceivers are used to link together various computers, which may be mobile or stationary. In 1985, the FCC established regulations to allow unlicensed use of certain bands if spread-spectrum techniques are used. In spread spectrum transmission, the energy radiated during radio transmission is spread across a wide spectrum of frequencies and is therefore less liable to cause substantial interference with other radio communications. FCC spread-spectrum regulations allow greater transmission power to be used without requiring special licensing, increasing the attainable range of communications for unlicensed systems.

There exist two principle spread spectrum transmission techniques, direct sequencing and frequency hopping. In direct sequencing, spreading is achieved through multiplication of the data by a binary pseudo random sequence whose chipping rate is many times the data rate. In frequency hopping, the carrier frequency remains at a given frequency for a duration and then hops to a new frequency somewhere in the spreading bandwidth.

Direct sequencing allows for coherent demodulation. In coherent demodulation, the receiver exploits knowledge of the carrier wave's phase reference to detect the signals. With frequency hopping, however, phase coherence is difficult to maintain; hence it is usually demodulated noncoherently. Non-coherent demodulation refers to demodulation performed with no knowledge of phase, i.e., without phase estimation processing. Non-coherent demodulation results in the advantage of reduced complexity over coherent demodulation but at the cost of an increased probability of error.

Frequency hopping offers other advantages with respect to direct sequence. Frequency hopping enables higher rates to be achieved without requiring very high speed logic that an equivalent direct sequency system would require. Frequency diversity, a technique used to combat multipath fading by transmitting data in multiple frequencies and thus increasing the likelihood that the data will make it through the channel uncorrupted, can be achieved at no additional cost.

As data files become increasingly large, support of a high data rate becomes an increasingly important factor in digital communications. High data rates, however, require larger bandwidths. The FCC, besides regulating transmission power, has also issued spectrum occupancy requirements. In the case of frequency hopping radio transceivers, more than 90% of the transmission energy must occur within a 1 megahertz bandwidth defined by the center frequency, $f_c$, $\pm 500$ kHz. This spectrum occupancy requirement defines what may be referred to as the "transmission mask".

At lower data rates, relatively simple modulations schemes may be used while fitting within a given transmission mask. One such modulation scheme is binary frequency shift keying (BFSK). BFSK has been used in direct sequence spread spectrum radio transceivers to achieve data rates of up to several hundred kilobits per second (kbps). For data rates in the megabits per second range, the use of BFSK results in a signal that does not fit within the allowed bandwidth or in an excessively costly design not suitable for cost-sensitive applications. A more complex modulation scheme is therefore required.

An example of one such modulation scheme is differential quadrature phase shift keying ("DQPSK"). In DQPSK, four information states are defined by changing the phase of a carrier signal in 90° increments. DQPSK is therefore a four state modulation scheme, allowing twice the data rate to be achieved through the same channel as compared to two state modulation. In DQPSK, the carrier phase of the previous signaling interval is used as a phase reference for demodulation. The information is therefore carried by the difference in phase between two successive waveforms. As compared to nondifferential QPSK in which the received signal is compared with the carrier reference, in DQPSK, two noisy signals are in effect compared with each other. Hence, DQPSK exhibits greater noise but allows for reduced system complexity. DQPSK can be demodulated using so-called "differentially coherent" demodulation, which does not require traditional coherent demodulation techniques but still requires more complex (IQ) demodulation. In addition, DQPSK is a type of phase modulation and as such is vulnerable to phase inversions that are commonly encountered in environments with multipath propagation such as the indoor environment.

Frequency shift keying (FSK) modulation schemes are generally less costly to implement than phase shift keying (PSK) modulation schemes. Although DQPSK performs better under lower signal-to-noise conditions, it is unsuitable for frequency hopping due to the need to know the carrier phase. In frequency hopping systems the carrier is always changing frequency, which creates problems in DQPSK systems, since small frequency errors translate into large phase errors. In addition, operation in multipath indoor environments creates phase reversals of the carrier as a transceiver moves across a null. Phase Shift Keying systems have difficulty dealing with this situation.

What is needed then is a digital communications system that achieves a spectral efficiency equivalent to DQPSK or QPSK but does not depend on knowledge of the carrier's phase. Frequency Shift Keying has been used traditionally for frequency hopping systems but does not achieve the desired spectral efficiency. The present invention addresses this issue.

SUMMARY OF THE INVENTION

The invention includes a communications transmitter for transmitting a digital bit stream and a communications receiver for receiving a digital bit stream. Combined, the communications transmitter and communications receiver constitute a communications transceiver. The present invention is referred to as a differentially encoded, 4-level frequency shift keying (D4FSK) transceiver and in its preferred embodiment provides for digital communications equipment that is low cost, miniaturizable, low in power consumption and high in spectral efficiency.

In accordance with one embodiment of the invention, a communications transceiver for transmitting and receiving digital information represented as a binary digital bit stream includes circuitry for converting a binary digital bit stream to be transmitted to a stream of multi-bit symbols, circuitry for differentially encoding the stream of multi-bit symbols to produce a stream of differentially encoded symbols, circuitry for frequency modulating a carrier signal in accordance with the differentially encoded symbols so as to represent each differentially encoded symbol by one of multiple frequencies related in number to a number of bits represented in the multi-bit symbols, circuitry for frequency modulating a carrier signal in accordance with the differentially encoded symbols so as to represent each differentially encoded symbol by one of multiple frequencies related in number to a number of bits in the multi-bits symbols, circuitry for frequency demodulating such a modulated carrier, producing a multi-level analog signal at the output of the demodulator where each of the levels correspond to the one of the transmitted frequencies (which in turn corresponds to one of the transmitted symbols), circuitry for converting the demodulated analog multilevel signal into a digital representation for further processing, circuitry for processing this digital representation of the transmitted symbols by adaptively determining decision thresholds derived from this digital representation of the transmitted symbols and used to determine which symbol is being received, circuitry for differentially decoding the received symbols, circuitry for mapping the differentially decoded symbols into bit groups corresponding to the transmitted bit groups, and circuitry for combining the bit groups into a received bit stream corresponding to the transmitted original bit stream. In addition, in a preferred embodiment, the communication transceiver has means for changing the carrier frequency in accordance with a pre-defined frequency hopping sequence.

BRIEF DESCRIPTION OF THE DRAWINGS

The present invention may be further understood from the following description in conjunction with the appended drawings. In the drawings:

FIG. 2a is a more detailed block diagram of the differential encoder of FIG. 1a;

FIG. 3b is a more detailed block diagram of the average of FIG. 3a;

DETAILED DESCRIPTION OF THE PREFERRED EMBODIMENTS

In a wireless local area network (LAN), each network node is typically equipped with a digital data transceiver including a digital data transmitter and a digital data receiver. Data is input to the transmitter of one node, where a radio frequency carrier is modulated and propagated to a receiver in another node. The receiver recovers the signal and outputs it as a digital binary data stream.

The present digital data transceiver uses the spread spectrum technique of frequency hopping. It also uses differential quaternary (4-level) frequency shift keying (D4FSK). In a D4FSK transmitter, a serial binary bit stream is arranged into a stream of consecutive bit pairs. For example, the bit stream 100111100100 . . . is paired up to form the stream 10,01,11,10,01,00 . . . Next, the stream of bit pairs is mapped into a symbol stream with each symbol having one of four possible values corresponding to integers 0,1,2 and 3. In the aforementioned example, the bit pair stream maps into the symbol stream 1,2,0,1,2,3. Other mapping arrangements are also possible and would work equally well. The resulting symbol stream is differentially encoded by performing an addition (modulo 4) of the next symbol generated from the next bit pair with the previous differentially encoded symbol. The result is the next differentially encoded symbol to be transmitted. The information contained in the bit pairs is therefore carried in the difference between two consecutive differentially encoded symbols instead of the absolute value of a symbol. Assuming that the previous differentially encoded symbol was 2, then the example above would result in the following stream of differentially encoded symbols: 3,1,1,2,0,3 . . . (2+1=3, 3+2=1, 1+0=1, 1+1=2, 2+2=0, 0+3=3 . . . with all additions being modulo 4). The differentially encoded symbols are then converted to a voltage which is proportional to the numeric value of the symbol and are frequency modulated onto a carrier in any of several commonly available ways.

The D4FSK receiver looks for the difference between two consecutive frequency-modulated, differentially-encoded symbols to determine which bit pair was transmitted to reconstruct the original bit stream.

It should be noted that the DFSK scheme can be used for other bit arrangements involving more or less than 2 bits per symbol and is of particular advantage in arrangements with more than one bit per symbol in which the symbols are then frequency modulated and the system is frequency hopped. The larger the number of symbols, the smaller the separation is between the frequencies used to represent the symbols. The system is therefore more susceptible to errors caused by frequency perturbations such as frequency noise, frequency drift, frequency distortion, etc. In the case of frequency hopping systems, this is of special importance because the agility requirements placed on the carrier generally result in frequency errors of the kind mentioned above. The differential encoding technique described above greatly aids in the detection of the frequency modulated signal by having the receiver remove any component of the signal that does not vary between two consecutive symbols. Therefore, the generation of the hopping carrier can be accomplished with simpler circuitry and lower cost by allowing some errors to be present while achieving accurate signal demodulation and detection.

Figure 1A:
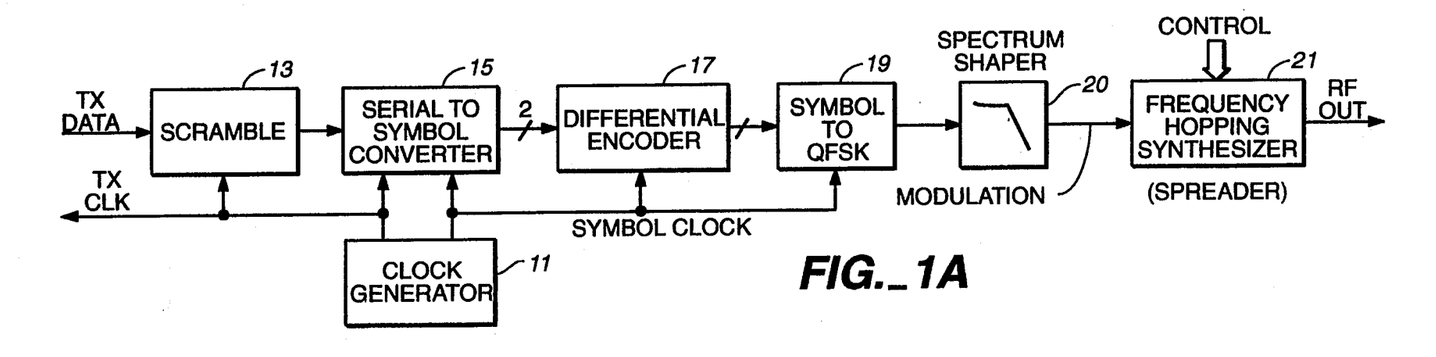
FIG. 1a is an overall block diagram of a frequency hopping D4FSK radio transmitter in accordance with the present invention.

Referring now to FIG. 1a, showing an overall block diagram of a frequency hopping D4FSK radio transmitter, a clock generator 11 produces a clock and the bit data rate by dividing down a crystal reference frequency. The clock generator also produces a clock at the symbol rate, which is one-half the bit rate. The symbol clock clocks all circuitry that processes symbols, namely a serial-to-symbol converter, a differential encoder and a symbol to 4FSK converter. The bit rate clock, TX_CLOCK, is also provided to the serial-to-symbol converter, as well as to a scrambler and to a host device.

The host device produces transmission data TX_DATA which is input to a scrambler 13. The scrambler effectively randomizes the transmission data, therefore maintaining data transitions of all types. As discussed hereinafter in relation to the frequency hopping D4FSK receiver of FIG. 1b, three-step transitions are required by an adaptive digital slicer for maximum signal value averaging, and two and three-step transitions are required by a phase-lock NCO for clock recovery. The scrambler also improves spreading on a given hop channel, and reduces carrier drift in the frequency hopping synthesizer. In the data receiver, the final bit stream is unscrambled using an inverse algorithm.

The randomized transmission data is input to a serial-to-symbol converter 15. The serial-to-symbol converter simply takes a pair of serial input bits and forms a symbol of two bits in parallel. The resulting two-bit symbols are then input to a differential encoder 17. In the differential encoder, a new symbol is summed with the last symbol that was output to form the next symbol to be output using modulo-4 arithmetic. At the receiver, a subtractor is used to decode the differentially encoded symbols. Assume for purposes of example that the symbols 00, 01, 10, 11 were to be transmitted in that order. The first symbol 00 would be summed with an implied last symbol of 00 using modulo-4 arithmetic producing 00 as the symbol to be output. Summing the next symbol 01 with the last symbol 00 produces 01 as the symbol to be output. Summing the next symbol 10 with the last symbol 01 produces the symbol 11 to be output. Finally, summing the next symbol 11 with the last symbol 11 produces the symbol 10 to be output.

The differentially encoded symbols are then converted to a stair-step voltage signal having four voltage levels in a symbol-to-4FSK converter 19. That is, the symbol-to-4FSK converter converts the symbol (bit pair) that is to be transmitted into voltages that can be used to modulate a frequency hopping synthesizer 21. A highest voltage level is used to represent the symbol 11, a next highest voltage level is used to represent the symbol 10, a next voltage level is used to represent the symbol 01 and a lowest voltage level is used to represent the symbol 00. The resulting stair-step voltage waveform is passed through a spectrum shaper 20 to produce a modulation signal for the frequency hopping synthesizer 21, the spectrum shaper ensuring that the resulting RF output signal fits within the required transmission window as previously discussed.

Whereas the scrambler 13 helps spread the spectrum within a given channel, the main spreading comes by the frequency hopping synthesizer 21 jumping from channel to channel in a specific pattern. Different networks may be created by using orthogonal hop sequences. A control signal applied to the frequency hopping synthesizer is used to designate a particular hop channel. As the control signal is varied, the frequency hopping synthesizer jumps from channel to channel.

Figure 1B:
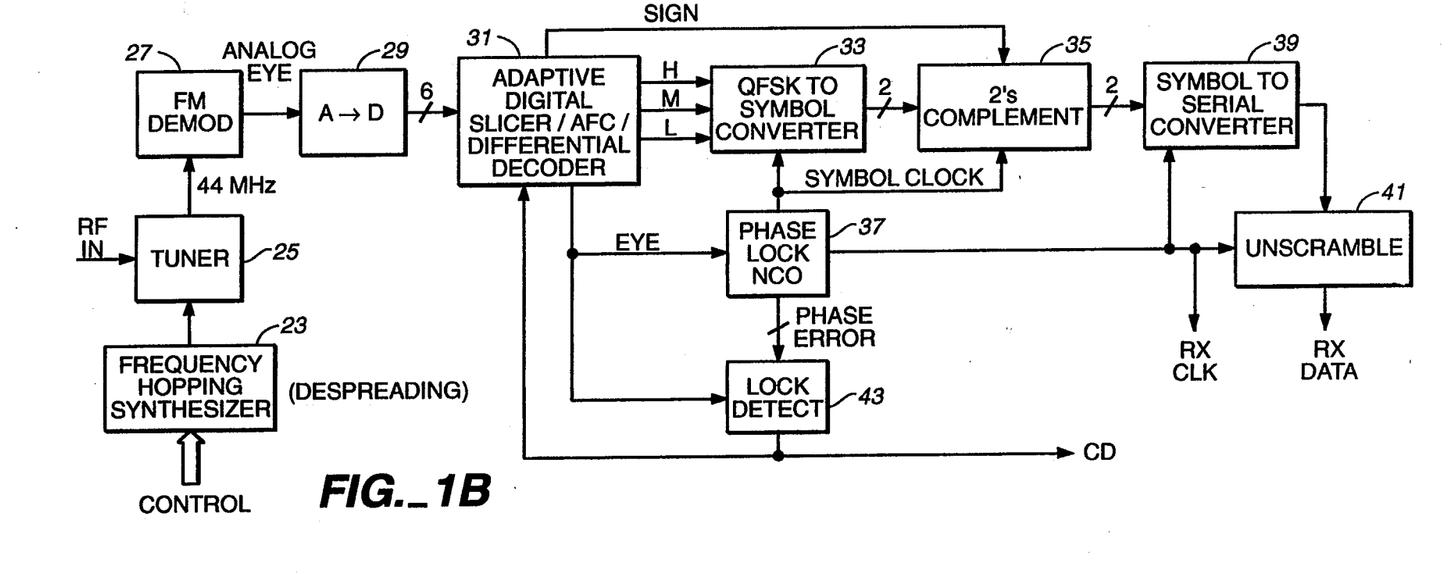
FIG. 1b is an overall block diagram of a frequency hopping D4FSK radio receiver in accordance with the present invention.

Referring to FIG. 1b, in the radio receiver, the spread spectrum radio frequency signal propagated by a radio transmitter such as the radio transmitter of FIG. 1a is despread using an identical frequency hopping synthesizer 23 jumping from channel to channel in the same specific pattern as the radio transmitter. The frequency hopping synthesizer controls a tuner 25 that is tuned to receive only radio signals within the band of a current hop channel. As a transmitter and a receiver jump from channel to channel in synchronism, what in reality is a series of different channels is made to appear as a single uninterrupted channel.

In operation, the tuner inputs the radio frequency signal and mixes it with the frequency hopping synthesizer output to despread the signal. Despreading therefore takes place before intermediate frequency (IF) filtering and demodulation, with the result that the frequency hop method exhibits inherently better sensitivity than an equivalent direct sequence approach. In an exemplary embodiment, the radio frequency signal output by the transmitter is in the vicinity of 2400 Mhz, and the intermediate frequency signal output by the tuner is in the vicinity of 44 Mhz.

Figure 7:
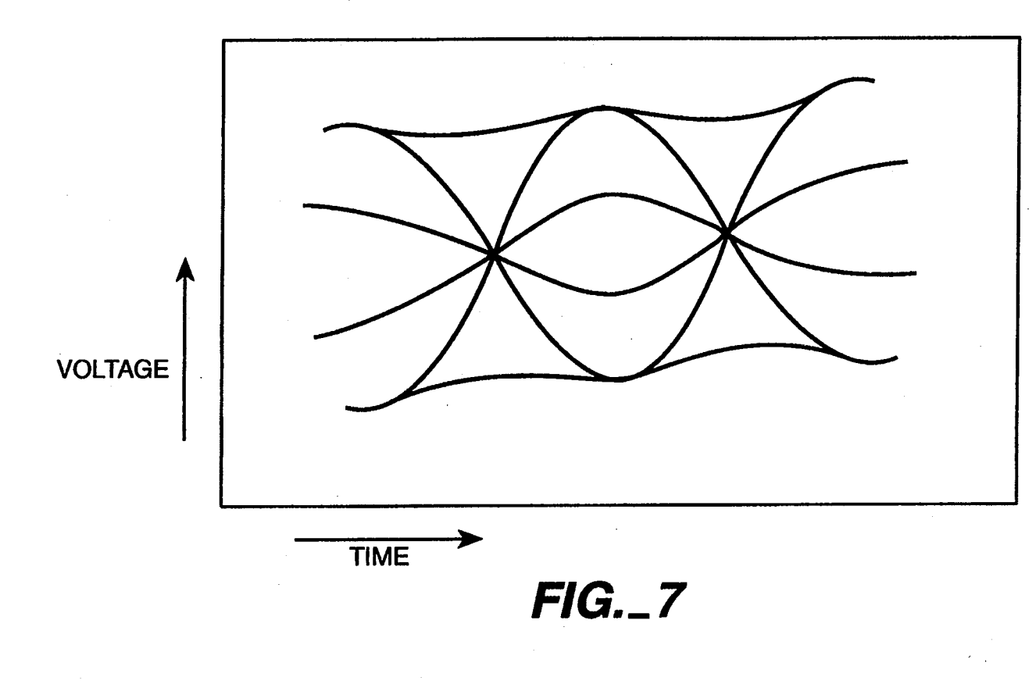
FIG. 7 is a diagram of a baseband voltage "eye" pattern.

The IF signal is input to an FM demodulator 27, which converts the frequency state changes into a base band voltage called an "eye" pattern, shown in FIG. 7. The FM demodulator therefore reproduces the stair-step analog voltage waveform produced in the transmitter by the symbol to 4FSK converter. The peak-to-peak voltage of the eye pattern, however, varies with the modulation index of the transmitter and with component tolerances. In addition, the DC level of the eye pattern varies depending on the frequency drift of the crystal oscillators in both the receiver and the transmitter as well as component variations.

In order to recover data quickly after an eye pattern is available, all data processing is done digitally, taking advantage of the non-linear nature of digital circuits. An A-to-D converter 29 is therefore used to 10 times oversample the incoming eye pattern. The oversampling operation produces a digitized FM video signal, i.e., a digital signal in which different signal levels correspond to different ones of the four D4FSK frequencies.

In known BFSK systems, typically an analog comparator is used to determine if the data sent is a one or a zero, with a reference voltage being connected to one input of the analog comparator and the FM video signal being connected to the other input of the analog comparator. Such an approach produces satisfactory performance in BFSK systems with large FM deviations.

In the present D4FSK system, a comparator (slicer) looks at the FM video to determine if the data sent is a 00, 01, 10, or 11. A number of factors render the analog, BFSK type approach unsuitable for use in the present high performance D4FSK system. The problem of recovering 4FSK is significantly more difficult than that of BFSK, because the receiver does not have a prior knowledge of where the thresholds should be set. The threshold voltages are based on the peak deviation and for the carriers center frequency and therefore must be adaptable. To calculate the threshold using analog circuitry, the maximum and minimum peaks of the FM video signal must be found and then heavily filtered to produce stable comparison voltages. Such filtering could require milliseconds to settle. A fast system, by contrast, requires the threshold to stabilize in tens of microseconds.

Further, in systems with small deviations, the FM video signal exhibits a poor signal to noise ratio such that the threshold voltages must be set very precisely. Such precision cannot be achieved with resistors and voltage sources that have relatively poor accuracy tolerances and comparators that have offset voltages and currents. In addition, an analog system is extremely sensitive to low frequency variations such as carrier drift in the transmitter synthesizer. The synthesizer is therefore required to have a very narrow loop bandwidth when transmitting, increasing its complexity. Moreover, when the input signal changes from a noisy input to a received signal input, the DC level of the signal is generally different than the DC level of the noise. This difference creates a large DC transient on the FM video signal that produces erroneous operation of an inexpensive analog comparator. Hence, reception of D4FSK using an analog approach is impractical if not impossible.

Instead, an adaptive digital slicer 31 of the present D4FSK receiver receives as its input a digitized, oversampled eye pattern (FM video signal) and outputs high, middle and low bits corresponding to which of a high, mid and low threshold value are exceeded by the value of the oversampled FM video signal as shown in the following Table 1. In the preferred embodiment the "eye" pattern is oversampled ten times each symbol period, although other oversampling rates are also possible.

TABLE 1

| FM Video | H | M | L | Symbol |
|---|---|---|---|---|
| low voltage | 0 | 0 | 0 | 00 |
| mid 1 | 0 | 0 | 1 | 01 |
| mid 2 | 0 | 1 | 1 | 10 |
| high voltage | 1 | 1 | 1 | 11 |

The adaptive digital slicer block also performs differential decoding and inherently performs a function analogous to automatic frequency control in analog FSK systems. The digitized eye pattern is first processed by a differential decoder. The differential decoder uses a subtractor to decode the differentially encoded symbol. Since a particular symbol is differentially encoded as the sum of that symbol and the previously transmitted symbol, the same symbol is differentially decoded by subtracting from a voltage value representing the symbol a voltage value representing the previously received symbol. The resulting voltage value is compared to the high, middle and low threshold values computed from an average maximum value of the digitized FM video signal. Based on the comparison results, the HML bits are set in accordance with Table 1 and input to a 4FSK-to-symbol converter 33, wherein the bits are converted to the corresponding symbol, also as shown in Table 1. If a sign bit from the differential decoder portion of the slicer block 31 indicates a negative value, then the output of the 4FSK-to-symbol converter is complemented in a 2s complementer 35 to account for the modulo nature of the differential encoding. The output of the 2s complementer is a series of symbols identical to the series of symbols input to the differential encoder of the radio transmitter.

The 4FSK-to-symbol converter and the 2s complementer are clocked by a symbol clock SYM_CLK produced by the phase lock NCO 37 in response to a timing signal derived from the analog eye output signal of the FM demodulator and designated "eye". The symbol clock is multiplied by two to produce a receive clock RX_CLK which is input to a symbol-to-serial converter 39 and an unscrambler 41. The phase lock NCO also operates in cooperation with a lock detect block 43 to produce a carrier detect signal CD. The carrier detect signal is input to the slicer block so as to enable to slicer to operate only after a signal is present. Otherwise, the slicer will find the peak-to-peak voltage of noise present at the RF input which, as will be seen, may lock up the slicer indefinitely. Clock recovery and carrier detection are discussed in greater detail hereinafter.

The symbol-to-serial converter 39 converts the two-bit symbol output from the 2s complementer into a serial data stream running at twice the symbol rate. Finally, the unscrambler 41 unscrambles the scrambled data to give an RX_DATA stream identical to the TX_DATA stream.

The purpose of the described D4FSK modulation is to allow for data recovery in the presence of low frequency noise superimposed on the modulation. Low frequency noise is injected into communication systems at a variety of places. One source of low frequency noise is carrier drift in the transmitter synthesizer due to a non-zero loop bandwidth in the presence of random FM modulation from the data to be transmitted. Another source of low frequency noise is AC coupling capacitors, which can cause large DC swings when the system goes from a no signal (noisy) condition to a signal input condition. In the case of strong interfering signals, the eye pattern is undetectable on an oscilloscope at the FM demodulator output. However, once the video signal is digitized and differenced, the differential eye pattern is substantially "clean".

The benefit of a differential method lies in the fact that signal level difference due to interfering modulation will remain constant over small time periods. Therefore, if the rate of an interfering modulation is much less than the symbol rate, it will not affect the receiver's pattern. For example, if the current symbol is 11 and the previous symbol is 00, then the output of the differential decoder will be the peak-to-peak voltage of the FM video eye pattern. No matter what the absolute DC level of the eye pattern, the peak-to-peak value will still be the same.

Figure 2A:
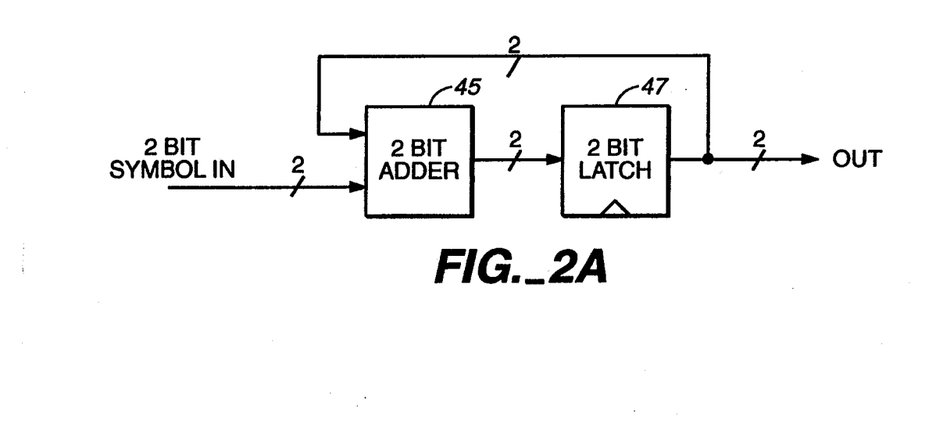

Referring to FIG. 2a, the transmitter differential encoder 17 of FIG. 1a may be realized using a 2 bit adder 45 and a 2 bit latch 47 that receives the output of the 2 bit adder. A 2 bit symbol from the serial-to-symbol converter 15 of FIG. 1a is input to the 2 bit adder together with the previous output of the 2 bit adder stored in the 2 bit latch. By this means, the present symbol is added to the previous symbol and output as a differentially encoded symbol.

Figure 2B:
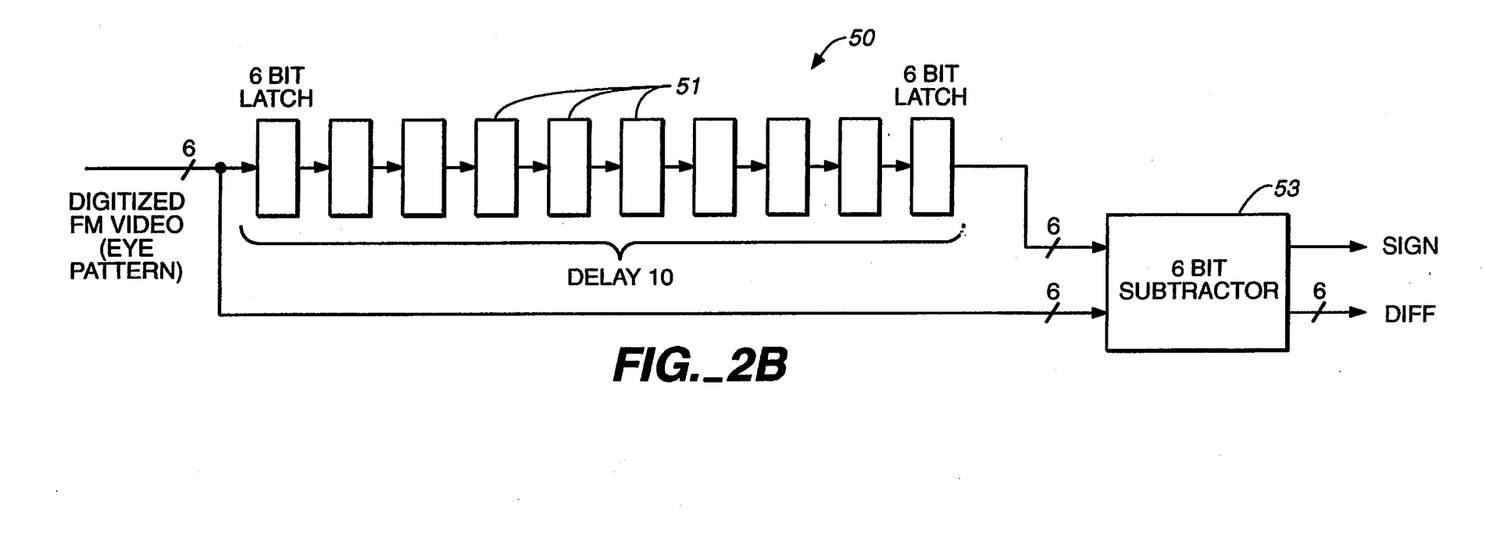
FIG. 2b is a more detailed block diagram of a differential decoder portion of the receiver of FIG. 1b.

The receiver sampling clock 10 times oversamples the incoming eye pattern. Thus, a chain 50 of 10 latches 51 is used in the receiver differential decoder to subtract the current symbol from the previous symbol as shown in FIG. 2b. The subtraction is performed by a 6 bit subtractor 53 which produces a 6 bit difference magnitude and a sign bit which is input to the 2's complementer as shown in FIG. 1b.

Figure 3A:
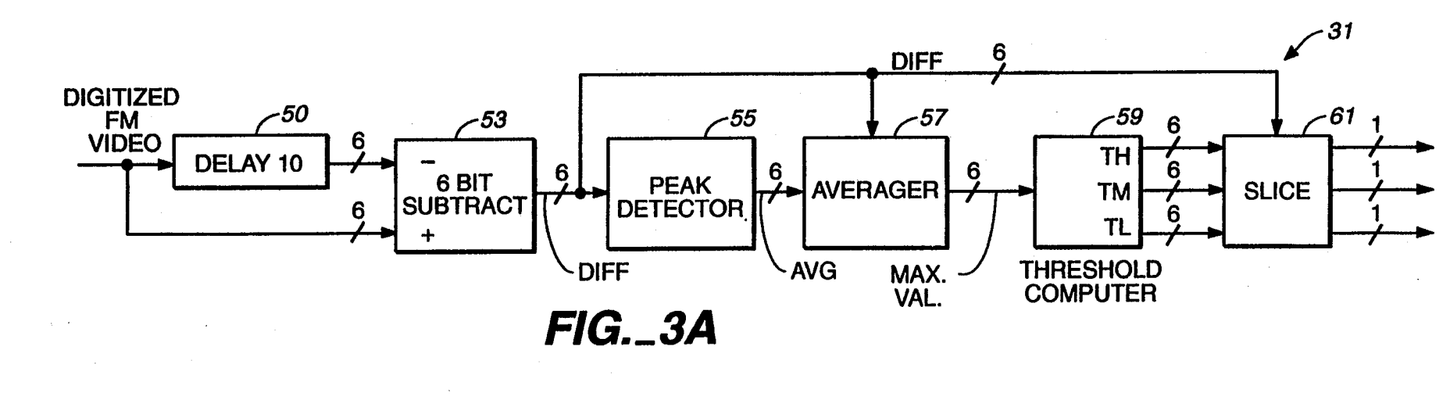
FIG. 3a is a more detailed block diagram of the adaptive digital differential slicer of FIG. 1b.

Referring to FIG. 3a, the difference magnitude output of the 6 bit subtractor is input to the adaptive digital slicer 31 of FIG. 1b. More particularly, the output of the differential decoder goes to a peak detector 55. The purpose of the peak detector is to output a signal when the difference magnitude is a peak-to-peak voltage value. This peak-to-peak value is needed to calculate the thresholds values used for data slicing. The peak detector outputs a pulse when two conditions are satisfied: (a) the difference goes through a maximum, i.e., it goes from a rising edge to a falling edge; and (b) the maximum is greater than the high threshold. This condition ensures that the maximum is a peak-to-peak maximum.

When the peak detector detects a peak-to-peak maximum, it outputs a signal AVG to an average 57. The average inputs the difference magnitude then present on the difference bus DIFF and combines it with a previously calculated average to arrive at a running average of the maximum peak-to-peak value. The average maximum peak-to-peak value, designated MAX_VAL, is input to a threshold computer 59.

The differential nature of the slicer allows the average to be realized with a very low gate count. A non-differential method, on the other hand, would require a maximum peak average and a minimum peak average. The computation of the thresholds would also be more complicated. Using a differential slicer, the thresholds may be very simply calculated as shown in the following Table 2.

TABLE 2

TM = MAX/2
TL = MAX/6
TH = MAX-TL

In the slicer block 61, the difference magnitude is compared to the threshold values input from the threshold computer to produce the H, M and L bits as in Table 1 above.

Figure 3B:
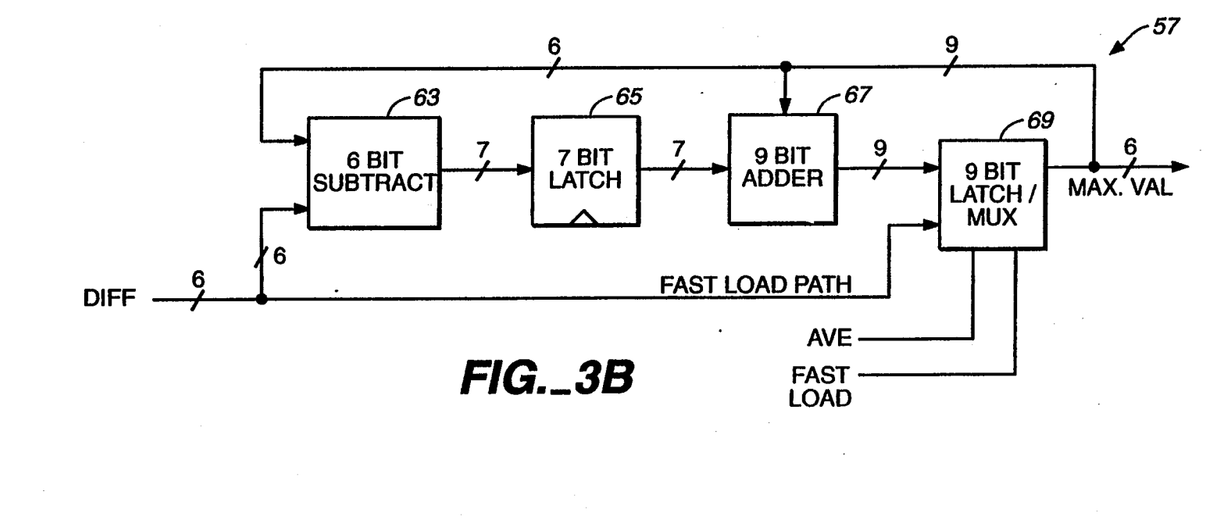

Referring to FIG. 3b, the average of the differential slicer may be realized using a 6 bit subtractor 63, a 7 bit latch 65, a 9 bit adder 67 and a 9 bit latch/mux 69.

At the input of the average, the 6 bit subtractor 63 subtracts the incoming peak-to-peak value from the value stored in the most significant 6 bits of the 9 bit latch 69. If a difference is zero, nothing changes. If the difference is not zero, the difference is added to the contents of the 9 bit latch 67, but the difference is first divided by 8. Therefore, 8 peaks that have an error of +1 are required to move the max register up one. A filtering action results, such that the max value will record the average peak-to-peak value even under heavy noise conditions.

A fast lock-up circuit enables the receiver to lock up to a received signal in 20 us. The fast lock-up circuit produces a FAST LOAD signal that is input to the 9 bit latch/mux 69 of the average. If the incoming peak-to-peak value is very different from the stored value, the slicer assumes that the MAX_REG is wrong and puts the new value directly into the MAX_REG.

The general approach to clock recovery used in the receiver is to detect and produce a pulse upon the occurrence of two and three step transitions, the resulting pulse train being input to the phase lock NCO 37 of FIG. 1b. The pulses occur roughly every symbol period. Some of the pulses, however, will be missing (because of noise and because one step transitions are not detected), and the pulses are subject to considerable pulse jitter. The function of the phase lock NCO is to extract from the pulse train a clean clock signal.

Figure 4A:
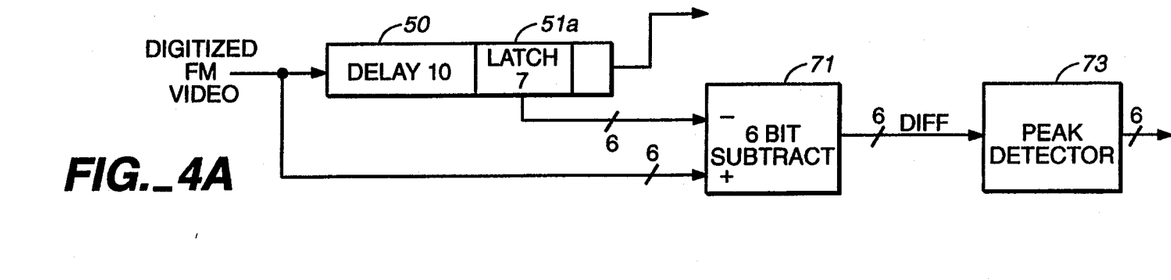
FIG. 4a is a block diagram of a timing signal generating portion of the adaptive differential slicer of FIG. 1b.

Referring to FIG. 4a, the pulse train, designated "eye", is produced by the slicer 31 of FIG. 1b in a similar manner as the peak detection signal AVG and using partially the same circuitry. An output of the seventh latch 51a of the delay 10 shift register is input together with the digitized FM video signal to a 6 bit subtractor 71 separate from but identical to the 6 bit subtractor 53 in FIG. 3a. The resulting difference signal is input to a peak detector 73 similar to the peak detector 55 in FIG. 3a, except that the peak detector 73, instead of detecting only three step transitions, detects two and three step transition. The peak detector 73 outputs a substantially regular pulse train "eye".

Figure 4B:
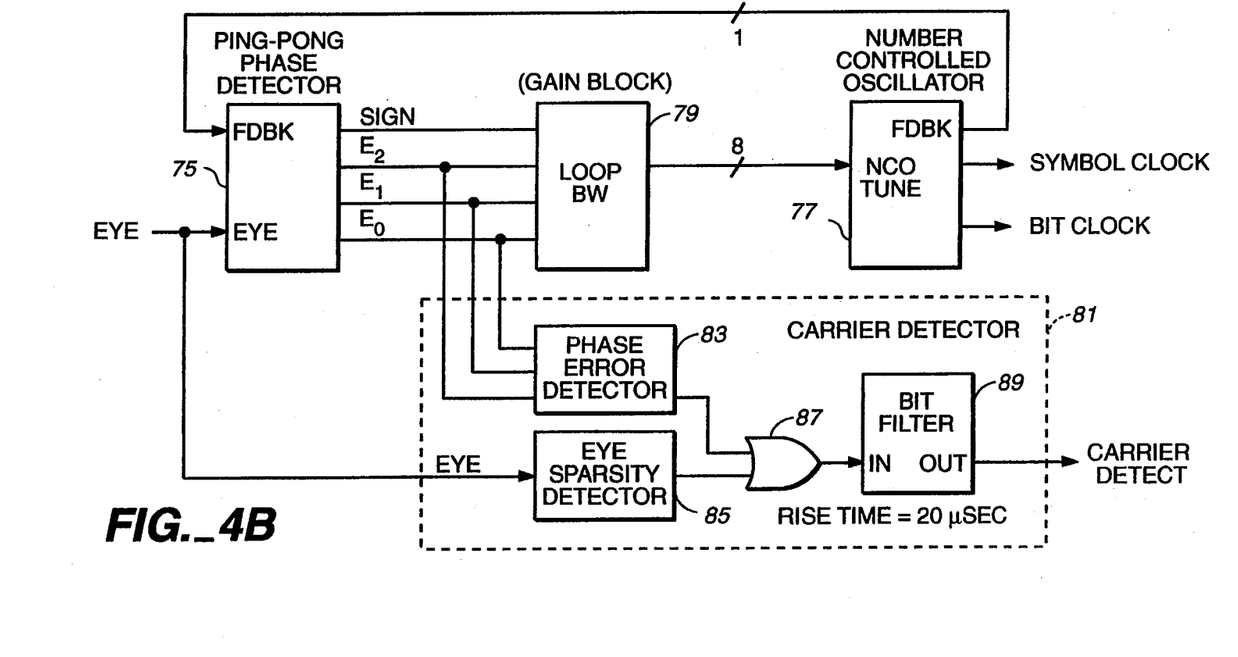
FIG. 4b is a more detailed block diagram of the phase-lock NCO and lock detect blocks of FIG. 1b.

FIG. 4b shows in greater detail the phase lock NCO and lock detect blocks of FIG. 1b. The pulse train eye is input to a ping-pong phase detector 75. The ping-pong phase detector contains two pipelined phased detectors. The pulse train starts a counter (not shown) that computes the time difference between the occurrence of a pulse in the pulse train and the occurrence of a pulse in a feedback signal from a number controlled oscillator 77. The number controlled oscillator (NCO) is set to produce as the feedback signal a pulse train having a nominal frequency of 800 Khz. If a new eye pulse occurs before the time difference calculation is finished, the second phased detector will operate on the newly arrived eye pulse. The time difference error is represented using a sign bit and three magnitude bits, E0, E1 and E2, all of which are input into a loop bandwidth module 79 and to a carrier detect circuit 81.

The loop bandwidth module is essentially a gain block that sends a tune number to the NCO. If the error is zero, then the NCO tune number is unity. If the error is greater than zero, the NCO is phase advanced and must be slowed down. A tune number less than one is sent to the NCO for one master clock cycle inducing a small phase shift in the NCO output without changing the frequency of the output. Similarly, if the error is less than zero as indicated by the sign bit, the NCO is phase retarded and must be sped up. A tune number greater than one is therefore sent to the NCO for one master clock cycle.

The phase-lock NCO is configured as a memoryless loop in that the phase detector output controls the NCO phase, not its frequency. This feature prevents possible overshoot or unstable oscillatory conditions. A standard Phase Lock Loop does not use a true phase controlled oscillator but rather it uses a frequency controlled oscillator. Because it tries to control phase by using frequency, this type of loop has an inherent integrator which "remembers" its previous state. Loops containing a memory can overshoot and even go unstable if they are not controlled correctly.

At high data rates in the megabits per second range, the network node's central processor is unable to keep up with the data. A dedicated communications processor is therefore used to process the RX_DATA. Direct memory access transfers are then used to place the data in the memory of the central processor. It is therefore imperative that such data be correct. For this reason, the receiver must be able to produce a carrier detect signal CD that is reliable and glitch-free. In conventional radio systems, a carrier detect signal is produced by comparing a radio signal strength indicator (RSSI) measurement to a threshold value. RSSI, however, measures signal strength regardless of the source, whether interfering or non-interfering. In a preferred embodiment, the present invention uses as a carrier detect circuit a circuit somewhat akin to a bit error estimator in order to ensure that only usable, non-interfering signals are received.

Referring still to FIG. 4b, the magnitude bits E0, E1 and E2 of the phase detector error signal are used together with the eye signal to produce the carrier detect signal. The error signal is weighted in a phase error detector block 83. For example, errors of ±3 contribute greater weight to an unlocked (no carrier) determination than errors of ±2, etc.

The eye signal is examined for sparsity in an eye sparsity detector 85. Because of the stringent rules placed on the input signal for an eye pulse to occur, random noise produces fewer pulses on the eye line than a real signal. Therefore, eye sparsity detection is useful for aiding in determination of an unlock condition. The longer the time between eye pulses, the larger the contribution to the determination of an unlocked condition. A sparse eye signal may also be indicative, for example, of an interfering continuous wave signal on the received channel.

In the case of a continuous wave interfering signal only, the eye signal will disappear. Normally, this condition would produce a zero error signal, since the phase detect indicates no error if no data is present on the eye signal. However, the eye sparsity detector will show an unmistakable unlock condition and will report correctly that the system is unlocked.

When the phase error is within bounds and the eye pulses are not detected to be sparse, a NOR gate 87 produces a binary low signal that is input to a bit filter 89.

The raw carrier detect line in a conventional radio receiver is "glitchy". For this reason, the bit filter 89 is needed. The input signal from the NOR gate 87 feeds the up/down line of a counter, the MSB of which forms the carrier detect output signal. In the case of the five stage counter, it takes 16 symbol times under high signal to noise ratio conditions for the counter to change from one state to another. Thus the rise time, in an exemplary embodiment, is about 20 us, giving a simple digital low pass filter function. A transmission header of the radio protocol is designed to facilitate error free operation. The phase detector 83, eye sparsity detector 85 and bit filter 89 of the carrier detector are shown in greater detail in FIGS. 5a, 5b and 5c, respectively.

Figure 5A:
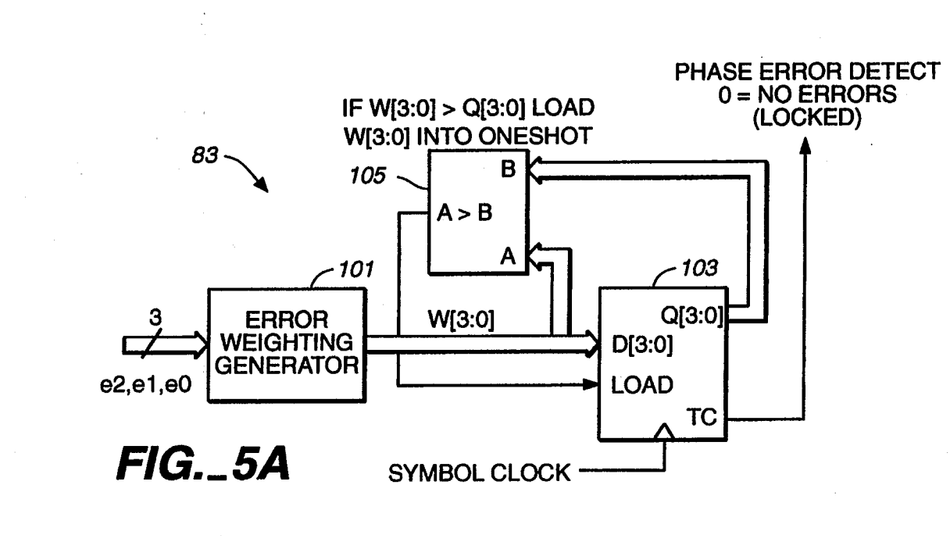
FIGS. 5a, 5b and 5c are block diagrams showing further details of the lock detect circuitry of FIG. 4.

Referring to FIG. 5a, in order to obtain enough error information to ensure proper operation, the magnitude bits E0, E1 and E2 of the phase detector error signal are weighted so that larger phase errors produce a disproportionally longer unlocked indication than do smaller phase errors. Without weighing, insufficient error information is obtained and the circuit appears to be locked substantially all of the time. Weighing is accomplished using a suitable look-up circuit 101.

The weighted error signal W[3:0] is input to a three-bit counter 103 whenever it exceeds the value already in the counter 103 as determined by a comparator 105. The counter 103 counts down with each symbol clock period. When the counter reaches zero (terminal count, TC), a locked condition is indicated by the phase error detector portion 83 of the carrier detect circuit 81.

Figure 5B:
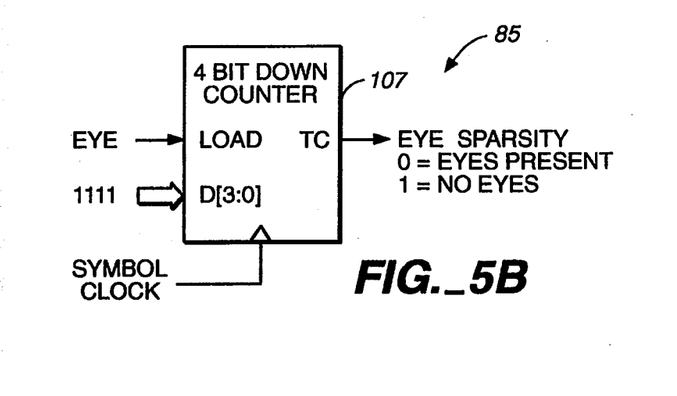

Referring to FIG. 5b, the eye sparsity detector 85 may be realized using a simple four-bit down counter clocked by the symbol clock. Upon each occurrence of an eye pulse, a constant value 1111 is loaded into the counter and then counted down with each symbol clock cycle. So long as the counter does not reach terminal count before a next eye pulse reloads the counter, a locked condition is indicated by the eye sparsity detector portion 85 of the carrier detect circuit 81.

As seen in FIG. 4B, the output signals of the phase error detector and the eye sparsity detector, both indicating a locked condition when their respective output signals are low, are ORed together by the OR gate 87. When the output of the OR gate 87 is a logic low signal, respective locked conditions as independently detected by the phase error detector and the eye sparsity detector coincide.

Figure 5C:
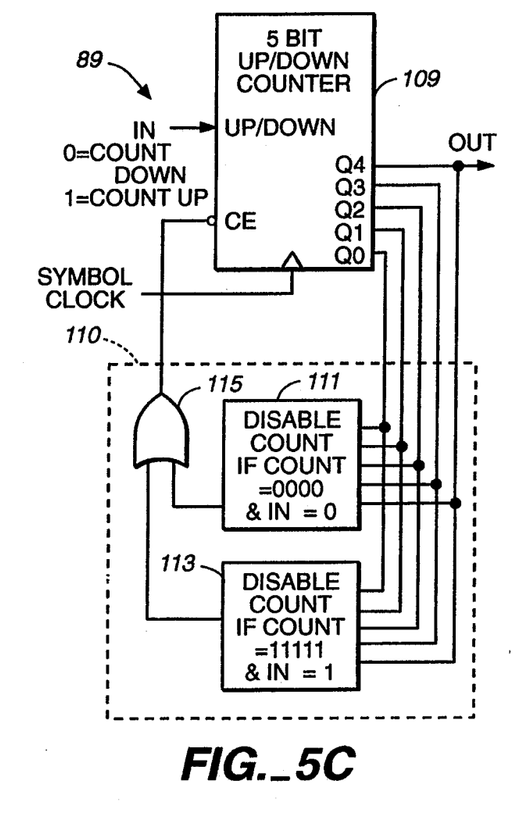

Referring to FIG. 5c, the bit filter 89 eliminates momentary glitches from the output of the OR gate 87. In effect, the bit filter determines whether the output of the OR gate 87 is mostly high (indicating an unlocked condition) or mostly low (indicating a locked condition). The bit filter may be realized using a 5-bit up-/down counter 109 and a logic circuit 110 that enables or disables the counter. The counter is clocked by the symbol clock and counts down when the input IN is 0 and up when the input IN is 1. The most significant bit of the counter forms the output signal OUT of the bit filter.

The logic circuitry 110 includes a circuit 111 that disables the counter if the count (excluding the MSB) is 0000 and the input symbol IN is zero and a circuit 113 that disables the counter if the count (including the MSB) is 11111 and the input signal IN is 1. The output signals from the circuits 111 and 113 are Ored together using an OR gate 115 and input to a chip enable input CE of the counter 109.

Assume, in operation, that the contents of the counter have just been initialized to zero and that the input signal IN indicates an unlocked condition. The counter will be disabled and will remain at zero count until the input signal IN dictates a locked condition, at which time the counter will begin to count up. The input signal IN must continue to indicate a locked condition for $10000_2$ ($16_{10}$) symbol clock cycles before the MSB of the count is asserted, giving a carrier detect indication. If the input signal IN continues to indicate a locked condition for 15 additional symbol clock cycles, the counter will reach 11111 and be disabled by the logic circuit 13. If a glitch occurs and the input signal IN indicates a temporary unlock condition, the counter will begin to count down, but the MSB will not be affected until the unlock condition has persisted for a given period of time. By the same token, if an unlocked condition has persisted for some time, causing the counter to reach a low or zero count, a temporary lock indication on the input signal will not affect the output signal of the bit filter. Rather, the lock indication must persist for a period of time to cause the output of the bit filter to change so as to indicate a locked condition.

Referring again to FIGS. 1a and 1b, a design of a frequency hopping synthesizer used in both the radio transmitter and the radio receiver facilitates fast frequency hopping while minimizing modulation distortion. Fast frequency transitions require a synthesizer to have a very wide loop bandwidth. To hop in 200 us, for example, a loop bandwidth greater than 20 KHz is required. To perform FM modulation, on the other hand, a very narrow loop bandwidth is required since a wide bandwidth would cause filtering and distortion of the modulation. Preferably, the loop bandwidth should be less than 1 KHz.

Figure 6:
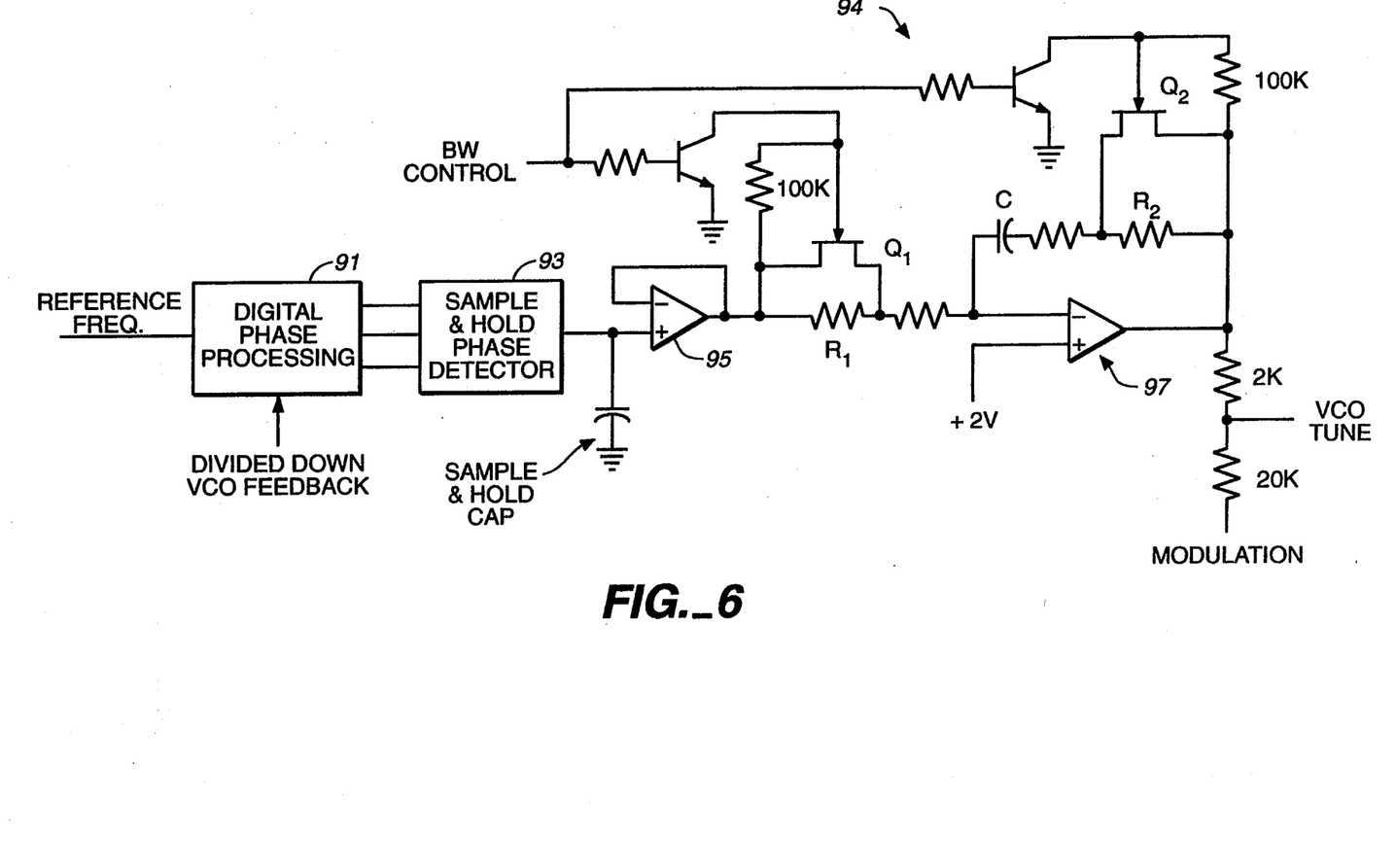
FIG. 6 shows in greater detail the frequency hopping synthesizers of FIGS. 1a and 1b.

Referring now to FIG. 6, the illustrated portion of a switchable loop bandwidth synthesizer allows for glitchless transitioning between wide and narrow loop bandwidth modes. A reference frequency and a divided down feedback signal from a voltage controlled oscillator (VCO, not shown) are input to a digital phase processing block 91 which produces a digital phase error number. The digital phase error number is converted to an analog signal and sampled in a sample and hold phase detector 93. The sampled analog signal is input to a loop filter 94 comprising two op-amps, one (95) at the loop filter input and another (97) at the loop filter output. The output of the first op-amp 95 is fed back directly to the inverting input of the op-amp. The output is also connected through a series combination of two resistors to the inverting input of the second op-amp filter 97. One of the series connected resistors, $R_1$, may be bypassed by controlling a field effect transistor (FET) $Q_1$. A bandwidth control signal BW control feeds a bipolar transistor and associated bias resistors in order to turn FET $Q_1$ on, effectively removing the resistor $R_1$ from the circuit, or off, allowing the resistor $R_1$ to remain in the circuit.

The non-inverting input of the second op-amp filter 97 is connected to a reference voltage (+2 V). The op-amp output is connected through the series combination of two resistors and a capacitor back to the inverting input. One of the series resistors, $R_2$, may be bypassed by a second FET $Q_2$ with its associated bipolar transistor and bias resistors. The output of the second op-amp filter passes through a resistor to produce a VCO TUNE output. A modulation input is connected through another resistor to the VCO TUNE output to effect modulation.

In most switchable loop bandwidth single loop synthesizers, when the loop is switched from wide to narrow mode, a ringing effect occurs and persists for a considerable time due to energy being coupled into the system, particularly in view of the long transient time of the loop in narrow mode. By using an op-amp active loop filter with low impedance drive at the input and output, the problem of ringing is avoided. Note that in the switchable loop bandwidth synthesizer of FIG. 6, the energy storage device (loop capacitor C), is unchanged during switching.

In wide mode with the FETs $Q_1$ and $Q_2$ turned fully on, the loop changes frequencies and settles to steady state. In steady state, because of the nature of the op-amps, the current through $R_1$ and $R_2$ is extremely small. Thus, when the FETs $Q_1$ and $Q_2$ are turned off, such that $R_1$ and $R_2$ are no longer bypassed, the effect on the circuit DC output voltage is negligible (i.e., the output frequency does not change). The AC characteristics, however, change by a factor of many thousands.

The foregoing has described the principles, preferred embodiments and modes of operation of the present invention. However, the invention should not be construed as limited to the particular embodiment has discussed. The above described embodiment should therefore be regarded as illustrative rather than restrictive. Variations may be made in those embodiments without departing from the scope of the present invention as defined by the following claims. For example, multi-level FSK modulation using 3 or 4 or more bits/symbol would benefit from the differential encoding technique.

What is claimed:

1. A communications transmitter for transmitting a digital bit stream, comprising:
   means for converting said digital bit stream to a stream of multi-bit symbols;
   means for differentially encoding said stream of multi-bit symbols to produce a stream of differentially encoded symbols; and
   means for frequency modulating a carrier signal in accordance with said differentially encoded symbols so as to represent each differentially encoded symbol by one of a plurality of frequencies related in number to a number of bits in said multi-bits symbols.

2. The apparatus of claim 1 wherein the number of frequencies is at least four.

3. A communications receiver for receiving a digital bit stream, encoded by forming multi-bit symbols and differentially encoding successive pairs of said multi-bit symbols to produce differentially encoded symbols, and frequency modulated so as to represent each differentially encoded symbol by one of a plurality of frequencies related in number to a number of bits of said multi-bit symbols, comprising:
   means for producing in response to an analog radio frequency input signal a demodulated FM signal in which different signal levels correspond to different ones of said plurality of frequencies;
   means responsive to said demodulated FM signal for adaptively determining a plurality of signal level thresholds corresponding to different ones of said plurality of frequencies and for comparing said demodulated FM signal to said thresholds to determine what particular symbol is being received and to produce a signal indicative thereof;
   means responsive to said signal for differentially decoding said signal into a stream of multi-bit symbols; and
   means responsive to said stream of multi-bit symbols for producing said digital bit stream.

4. The apparatus of claim 3 wherein the number of frequencies is at least four.

5. A communications transceiver for transmitting and receiving digital information represented as a digital bit stream, comprising:
   means for converting a digital bit stream to be transmitted to a stream of multi-bit symbols;
   means for differentially encoding said stream of multi-bit symbols to produce a stream of differentially encoded symbols;
   means for frequency modulating a carrier signal in accordance with said differentially encoded symbols so as to represent each differentially encoded symbol by one of a plurality of frequencies related in number to a number of bits in said multi-bits symbols;
   means for producing in response to an analog radio frequency input signal a demodulated FM signal, in which different signal levels correspond to different ones of said plurality of frequencies;
   means responsive to said demodulated FM signal for adaptively determining a plurality of signal level thresholds corresponding to different ones of said plurality of frequencies, and for comparing said demodulated FM signal to said thresholds to determine what particular symbol is being received and to produce a signal indicative thereof;
   means responsive to said signal for differentially decoding said signal into a stream of multi-bit symbols; and
   means responsive to said stream of multi-bit symbols for producing a received bit stream.

6. The apparatus of claim 5 wherein the number of frequencies is at least four.

7. The apparatus of claim 6 wherein the transceiver employs D4FSK encoding/modulation.

8. The apparatus of claim 6 wherein said means for adaptively determining said plurality of signal level thresholds comprises means for determining an average peak value of said demodulated FM signal and means for arithmetically computing said plurality of signal level thresholds from said average peak value.

9. The apparatus of claim 6 wherein the transceiver employs frequency hopping, and further comprises:
first frequency hopping synthesizer means responsive to a first control signal for varying a transmit center frequency of said carrier signal in a predetermined pattern; and
second frequency hopping synthesizer means responsive to a second control signal for varying a receive center frequency in a predetermined pattern.

10. The apparatus of claim 9 wherein said first and second frequency hopping synthesizer each comprises a phase lock loop comprising:
a voltage controlled oscillator;
a reference frequency source;
a phase detector connected to said reference frequency source and to a frequency divided output of said voltage controlled oscillator; and
a loop filter connected to said phase detector and said voltage controlled oscillator and switchable between a wide bandwidth for agile frequency hopping and a narrow bandwidth for frequency stability between hops.

11. The apparatus of claim 10 wherein said loop filter comprises an operational amplifier active loop filter.

12. The apparatus of claim 11 wherein said operational amplifier active loop filter comprises:
an operational amplifier;
a voltage source connected to a first input terminal of said operational amplifier;
a variable resistance connected to a second input terminal of said operational amplifier and to a signal proportional to a phase difference between said reference frequency and said feedback signal; and
the series combination of a variable resistance and a capacitor connected between an output terminal of said operational amplifier and said second input terminal, a signal produced at said output terminal being used to tune said voltage controlled oscillator.

13. The apparatus of claim 6 wherein said means for producing a demodulated FM signal comprises:
a tuner for selectively receiving a portion of said analog radio frequency input signal within an frequency band centered about a receive center frequency;
means responsive to said portion of said analog radio frequency input signal for producing an analog FM signal in which different signal levels correspond to different ones of said plurality of frequency; and
means for sampling said analog FM signal to produce said demodulated FM signal.

14. The apparatus of claim 13 wherein said means for sampling oversamples said analog FM signal by some multiple.

15. The apparatus of claim 14 wherein said multiple is at least 10.

16. The apparatus of claim 13 further comprising clock recovery means responsive to said demodulated FM signal for producing a clock signal synchronized with a received symbol rate.

17. The apparatus of claim 16 wherein said clock recovery means comprises a phase-lock loop, including phase detection means.

18. The apparatus of claim 17 wherein said phase-lock loop includes a number controlled oscillator.

19. The apparatus of claim 17 wherein said clock recovery means comprises means responsive to said demodulated FM signal for detecting transitions in said demodulated FM signal and for outputting a pulse to said phase-lock loop upon the occurrence of said transitions.

20. The apparatus of claim 19 wherein said means for detecting transitions detects only transitions greater than one-step transitions.

21. The apparatus of claim 19 further comprising:
means responsive to a phase difference output of said phase detection means for producing a first signal indicative of a state of lock/unlock of said clock recovery means with respect to said analog radio frequency input signal;
means responsive to said means for detecting transitions for producing a second signal indicative of a state of lock/unlock of said clock recovery means; and
means for logically combining said first and second signals to produce a third signal indicative of a state of lock/unlock of said clock recovery means with respect to said analog radio frequency input signal.

22. The apparatus of claim 21 wherein said third signal is a one-bit digital signal.

23. The apparatus of claim 22 further comprising bit filter means for filtering said third signal to produce a final signal indicative of a state of lock/unlock of said clock recovery means with respect to said analog radio frequency input signal.

24. The apparatus of claim 23 wherein said bit filter means comprises an up/down counter clocked by said clock signal and responsive to one logic condition of said third signal to count in a first direction and responsive to an opposite logic condition of said third signal to count in an opposite direction and wherein a most-significant output bit of said counter provides said final signal.

25. The apparatus of claim 24 further comprising means responsive to said third signal and an output count of said counter for selectively disabling said counter.

* * * * *